(12) United States Patent
Nissen

(10) Patent No.: US 10,846,530 B2
(45) Date of Patent: Nov. 24, 2020

(54) HYPERSPECTRAL IDENTIFICATION OF TARGET

(71) Applicant: Bell Helicopter Textron Inc., Fort Worth, TX (US)

(72) Inventor: Jeffrey Paul Nissen, Alba, TX (US)

(73) Assignee: Bell Helicopter Textron Inc., Fort Worth, TX (US)

(*) Notice: Subject to any disclaimer, the term of this patent is extended or adjusted under 35 U.S.C. 154(b) by 86 days.

(21) Appl. No.: 16/224,057

(22) Filed: Dec. 18, 2018

(65) Prior Publication Data

US 2020/0193133 A1 Jun. 18, 2020

(51) Int. Cl.
*G06K 9/00* (2006.01)
*G06T 3/40* (2006.01)
*G01J 3/28* (2006.01)
*G06K 9/32* (2006.01)
*G06T 7/70* (2017.01)

(52) U.S. Cl.
CPC .......... *G06K 9/0063* (2013.01); *G01J 3/2823* (2013.01); *G06K 9/32* (2013.01); *G06T 3/4038* (2013.01); *G06K 2009/00644* (2013.01); *G06T 7/70* (2017.01)

(58) Field of Classification Search
CPC ............. G06K 9/00657; G06K 9/6247; G06K 9/6249; G06K 9/00127; G06K 9/00046; G06K 9/0063; G06K 9/32; G06K 2009/00644; G01J 3/0264; G01J 3/027; G01J 3/0297; G01J 3/28; G01J 3/2823; G06T 3/4038; G06T 7/70; G01N 21/31
See application file for complete search history.

(56) References Cited

U.S. PATENT DOCUMENTS

| | | | | |
|---|---|---|---|---|
| 5,187,754 A * | 2/1993 | Currin | .................. | G06K 9/0063 375/E7.086 |
| 5,528,290 A * | 6/1996 | Saund | ...................... | G06K 9/20 348/218.1 |
| 5,649,032 A * | 7/1997 | Burt | ......................... | G06K 9/32 382/284 |
| 6,694,064 B1 * | 2/2004 | Benkelman | .......... | G06K 9/0063 348/144 |
| 2016/0210747 A1 * | 7/2016 | Hay | ........................ | G06T 7/262 |

(Continued)

FOREIGN PATENT DOCUMENTS

EP 2778707 B1 1/2017
WO WO-2011027315 A1 3/2011

*Primary Examiner* — Diane D Mizrahi
(74) *Attorney, Agent, or Firm* — Shackelford, Bowen, McKinley & Norton, LLP

(57) ABSTRACT

Methods and systems of locating an object of interest with a hyperspectral imaging system include placing a hyperspectral tag on the object of interest. A hyperspectral camera then then collects light emitted by an area of interest. An analyzer unit of the hyperspectral imaging system processes the collected light emitted by the area of interest into a hyperspectral image. The hyperspectral image includes a data file that includes information regarding a spectral response at each pixel of the first hyperspectral image. The analyzer unit then compares the spectral response at a first pixel of the hyperspectral image with the spectral response of the hyperspectral tag. Based upon the comparison, the analyzer unit generates an identity of the object of interest.

20 Claims, 4 Drawing Sheets

(56) References Cited

U.S. PATENT DOCUMENTS

2017/0124781 A1* 5/2017 Douillard ............... G08G 1/202
2017/0351261 A1* 12/2017 Levinson ................ G01S 13/86
2018/0190046 A1* 7/2018 Levinson ............. G07C 5/0808

* cited by examiner

HYPERSPECTRAL IDENTIFICATION OF TARGET

BACKGROUND

This section provides background information to facilitate a better understanding of the various aspects of the disclosure. It should be understood that the statements in this section of this document are to be read in this light, and not as admissions of prior art.

The ability to identify troops, ground personnel, and vehicles as friend or foe is important for numerous reasons. For example, when approaching people on a battlefield, it can be critical to the safety and success of a mission to know where friendly and enemy troops are located. Despite the availability of communication devices and technologies, properly identifying people and/or vehicles can be challenging.

SUMMARY

An illustrative method of analyzing an object of interest with a hyperspectral imaging system includes: collecting, via a hyperspectral camera of the hyperspectral imaging system, light emitted by the object of interest; passing the collected light through an optical interferometer; determining, via an analyzer unit of the hyperspectral imaging system, a spectral response of the collected light; generating, via the analyzer unit, a data file of a hyperspectral image, the data file comprising information regarding a spectral response at each pixel of the hyperspectral image; comparing, via the analyzer unit, a spectral response at a first pixel of the hyperspectral image with a spectral response of a known object, the first pixel being associated with the object of interest; and responsive to the comparing, generating, via the analyzer unit, an identity of the object of interest.

An illustrative method of locating an object of interest with a hyperspectral imaging system includes: placing a hyperspectral tag on the object of interest, wherein a spectral response of the hyperspectral tag is known; collecting, via the hyperspectral imaging system, light emitted by an area of interest; processing, via an analyzer unit of the hyperspectral imaging system, the collected light emitted by the area of interest into a first hyperspectral image, the first hyperspectral image comprising a data file that comprises information regarding a spectral response at each pixel of the first hyperspectral image; comparing, via the analyzer unit, the spectral response at a first pixel of the first hyperspectral image with the spectral response of the hyperspectral tag, the first pixel being associated with the object of interest; and responsive to the comparing, generating, via the analyzer unit, an identity of the object of interest.

An illustrative hyperspectral imaging system for locating an object of interest includes: a hyperspectral tag associated with the objected of interest; a hyperspectral camera for collecting light emitted by an object of interest; an interferometer that modulates the collected light emitted by the object of interest; an analyzer unit for processing the modulated light to generate a data file that comprises information regarding a spectral response at each pixel of a hyperspectral image and analyzing the hyperspectral image to locate the spectral response of the hyperspectral tag within the hyperspectral image, the analyzer unit comprising a CPU and memory; and a repository for storing captured hyperspectral images.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
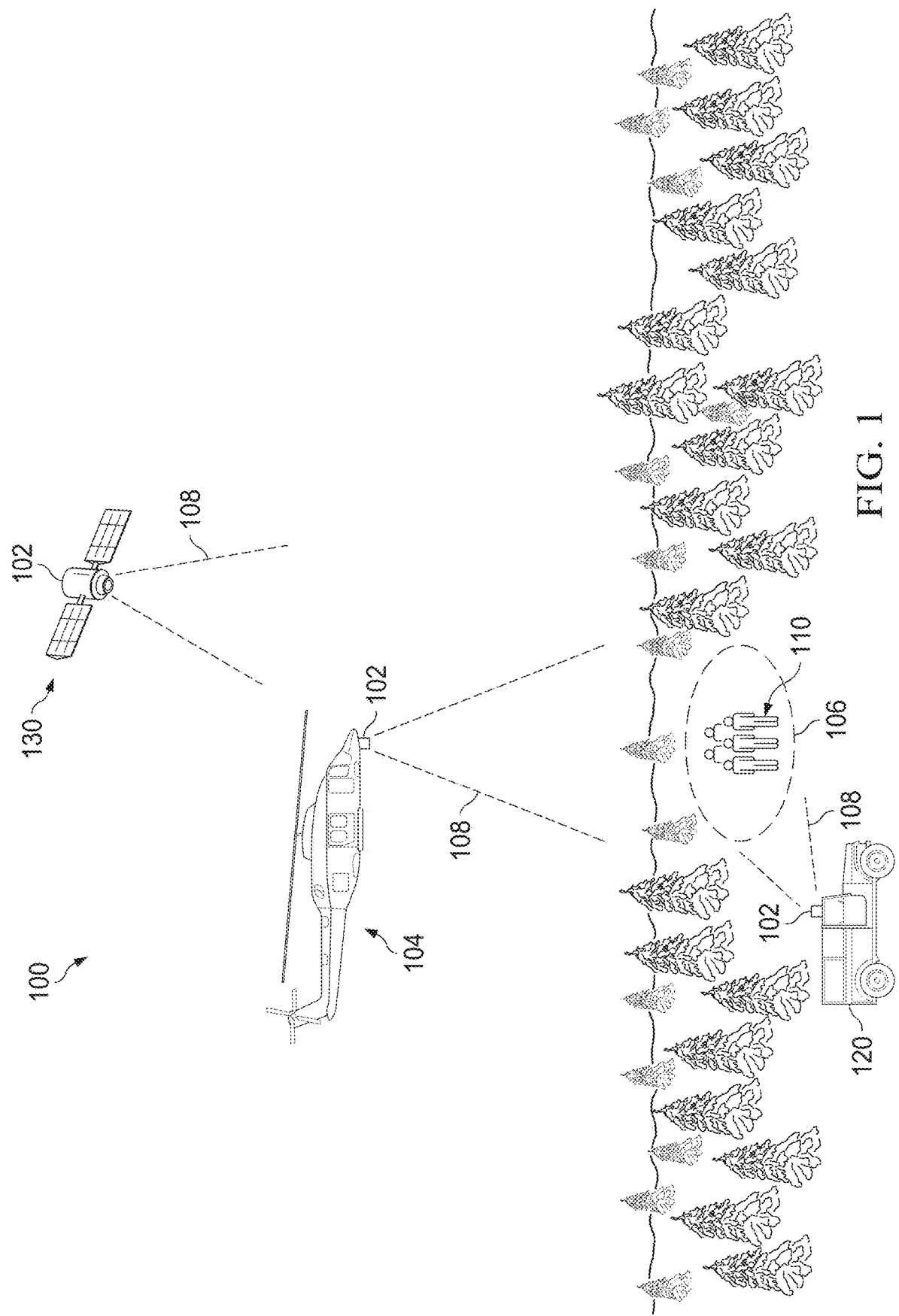
FIG. 1 illustrates a hyperspectral imaging system for identification of an object according to aspects of the disclosure.

It is to be understood that the following disclosure provides many different aspects, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

When electromagnetic radiation (e.g., light) is incident upon an object, the electromagnetic radiation is affected by the properties of the object. The wavelengths of light that are reflected or emitted back comprise an object's spectral response. For example, physical, chemical, and/or biological properties of the object affect absorption, diffusion, reflection, diffraction, scattering, and/or transmission of the electromagnetic radiation. The response of the electromagnetic radiation represents a spectral fingerprint of an object that provides information that can be analyzed and used by a hyperspectral imaging system to help identify and characterize the object. An example of a hyperspectral imaging system includes an image capture system and an analysis system. The image capture system includes, for example, optics, mechanics, electronics, and peripheral hardware and software, for capturing a hyperspectral image of the area of interest. The analysis system includes software and mathematical algorithms for analyzing, displaying, and presenting analysis of objects in the area of interest.

Analysis of a hyperspectral image can include determining a spectral intensity and/or wavelength of light at each pixel in a hyperspectral image. Before a hyperspectral image can be analyzed, light emitted by an object must first be collected/captured by a hyperspectral camera and processed into a data file. For example, the spectral intensity of a pixel in a hyperspectral image is determined by collecting incident light emitted by an object. The light is passed through a prism array or an optical interferometer. The optical interferometer outputs modulated light corresponding to a set of linear combinations of the spectral intensity of the light emitted at each pixel coordinate. The modulated light from the optical interferometer is focused onto a detector array or matrix, followed by a scan of the optical path difference (OPD) generated for all pixels. The outputs of the detector array are then processed for determining a spectral intensity or wavelength of each pixel needed for generating spectral (cube) images. In the case of interferometry, spectral imaging is practiced by utilizing various different types of interferometers where the OPD is varied in order to synthesize the interferograms by moving the entire interferometer, by moving an element within the interferometer, or by changing the angle of incidence of the incoming radiation. In each case, optical scanning of the interferometer enables synthesizing interferograms for all pixels of the imaged scene.

Hyperspectral imaging and analysis is an analytical method that combines the sciences and technologies of spectroscopy and imaging. Hyperspectral imaging and analysis utilizes a combination of spectroscopy and imaging theories to analyze samples of interest. Hyperspectral images include data for a number of spectral bands. Each hyperspectral image is captured in a data file or record that includes a three-dimensional pixel data array. The data record is captured by a hyperspectral imaging system and stored in a computer-readable storage medium, such as a disk drive, memory card, or the like.

Each hyperspectral image includes a three dimensional dataset of voxels (volume of pixels). Two of the dimensions (X, Y) are spatial or positional coordinates and the third dimension is the wavelength (λ) of the emitted light of the object. In some aspects, X, Y correspond with coordinates of pixels in the hyperspectral image. The coordinates of each voxel in a spectral image may be represented as (X, Y, λ). Any particular wavelength (λ) of imaged light of the object is associated with a set of spectral images that identify the spectral response of the object in two dimensions. Each spectral image can be analyzed to produce a two dimensional map of one or more physicochemical properties, for example, geometrical shape, form, or configuration, and dimensions, and/or chemical composition, of the object and/or of components of the object, in a scene or sample.

In hyperspectral imaging, multiple images of each object are generated from object-emitted electromagnetic radiation having wavelengths and frequencies associated with different selected parts or bands of an entire spectrum emitted by the object. For example, hyperspectral images of an object are generated from object-emitted electromagnetic radiation having wavelengths and frequencies associated with one or more of the following bands of an entire spectrum emitted by the object: the visible band, spanning the wavelength range of about 400-700 nanometers, the infra-red band, spanning the wavelength range of about 800-1200 nanometers, and the deep infra-red band, spanning the wavelength range of about 3-12 microns. Data and information of the hyper-spectral images can be used for identifying, discriminating, classifying, and quantifying objects within the area of interest by analyzing different signature spectra present in pixels of the hyperspectral images.

In aspects of the disclosure, steps or procedures, and sub-steps or sub-procedures, can be performed by a data processor, such as a computing platform, for executing a plurality of instructions. Optionally, the data processor includes volatile memory for storing instructions and/or data, and/or includes non-volatile storage, for example, a magnetic hard-disk and/or removable media, for storing instructions and/or data. Optionally, certain forms disclosed herein include a network connection. Optionally, certain forms disclosed herein include a display device and a user input device, such as a keyboard and/or mouse.

FIG. 1 illustrates a hyperspectral imaging system 100 for hyperspectral identification of an object according to aspects of the disclosure. Hyperspectral imaging system 100 includes a hyperspectral camera 102 that is used to capture hyperspectral images. In some aspects, hyperspectral camera 102 is mounted to an aircraft 104. In some aspects, hyperspectral camera 102 can be mounted to a land vehicle 120 or a satellite 130. As illustrated in FIG. 1, aircraft 104 is a helicopter. Aircraft 104 could instead be an airplane, a tiltrotor aircraft, and the like. As illustrated in FIG. 1, land vehicle 120 is a truck. Land vehicle 120 could instead be any another type of land vehicle, such as a car, motorcycle, ATV, and the like. Hyperspectral imaging system 100 also includes systems for analyzing and storing data captured by hyperspectral camera 102. The systems for analyzing and storing data will be discussed in more detail relative to FIG. 3.

As illustrated in FIG. 1, aircraft 104 is positioned over an area of interest 106 so that a field of view 108 of hyperspectral camera 102 is aligned with the area of interest 106. In other aspects, land vehicle 120 or satellite 130 is positioned so that hyperspectral camera 102 has a line of sight to area of interest 106. When hyperspectral camera 102 has targeted area of interest 106, hyperspectral camera 102 collects hyperspectral images of area of interest 106. Field of view 108 illustrates the amount of area that is viewable by hyperspectral camera 102. Multiple hyperspectral images of area of interest 106 can be collected by hyperspectral camera 102. The hyperspectral images capture information regarding electromagnetic radiation that is emitted/reflected by objects within the captured image. The term object is used broadly herein to include people, weapons, vehicles, and items associated with any of the foregoing (e.g., clothing, armor, vehicle components etc.). For example, the hyperspectral images include information about a plurality of wavelengths and frequencies emitted by objects within the hyperspectral image. Hyperspectral imaging system 100 provides highly resolved spectral and spatial data of area of interest 106.

Using hyperspectral imaging system 100 to analyze a spectral response of an object can help identify the object. The term "spectral response" is used broadly herein to describe wavelengths of light emitted/reflected by an object upon which electromagnetic radiation/light is incident. For example, by comparing a measured spectral response of an object with a known spectral response of a reference object, the object can be characterized as known or unknown. Known spectral responses can be stored in a database and used as reference points to help characterize captured spectral responses.

By way of example, FIG. 1 illustrates an object of interest 110 in area of interest 106. In FIG. 1, object of interest 110 is illustrated as a group of people. Object of interest 110 could instead be a vehicle, a building, etc. Hyperspectral camera 102 collects hyperspectral images of the object of interest 110. The collected images are processed by hyperspectral imaging system 100 and compared to known spectral responses that are stored in a database for reference. Known spectral responses can include spectral responses of worn items (e.g., a soldier's uniform, helmet, armor, footwear, backpacks, and the like), commonly carried items (e.g., weapons, radios, and the like), vehicles (e.g., cars, trucks, motorcycles, ATVs, airplanes, helicopters, tiltrotors, and the like), etc. By way of example, the database can include known spectral responses for friendly soldiers, vehicles, and the like. Examples of spectral responses are illustrated in FIGS. 2A-2C and discussed in more detail below.

Hyperspectral images of object of interest 110 are processed by hyperspectral imaging system 100. The processing includes identifying the spectral responses (e.g., FIGS. 2B-2C) of objects within the captured hyperspectral images. For example, processing includes analyzing wavelengths of light emitted at each pixel of the captured hyperspectral images and generating a data record or file of the analyzed images. Hyperspectral imaging system 100 then analyzes the spectral responses within the captured hyperspectral images for responses that match the known spectral responses. The analysis by hyperspectral imaging system 100 determines if any full or partial matches of the known spectral responses exist.

Matches between collected spectral responses and the known spectral responses provide information regarding the object. In some aspects, a match may indicate that the object of interest 110 includes friendly soldiers. This information can then be used as needed in accordance with carrying out a mission or the like. If no matches are found, it may be presumed that the object of interest 110 does not include friendly soldiers. This information can then be used as needed in accordance with carrying out a mission or the like. In other examples, an object of interest may be something other than a group of people. For example, the object of interest could be a vehicle. The process of analyzing the vehicle is very similar to the process discussed above regarding the object of interest 110.

Figure 2A:
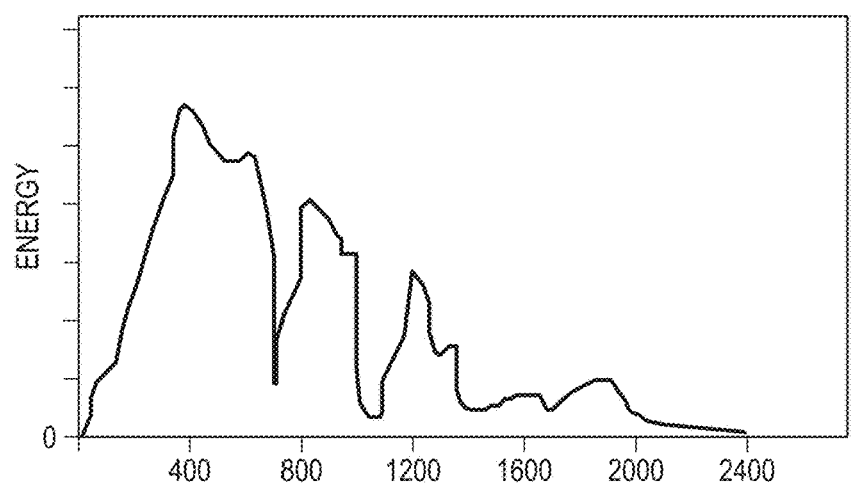
FIGS. 2A-2C are graphs illustrating spectral responses of objects according to aspects of the disclosure.
Figure 2B:
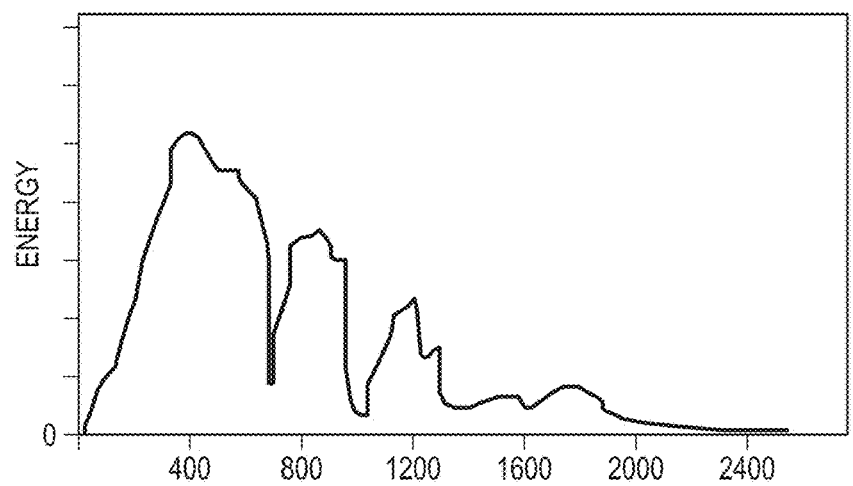
Figure 2C:
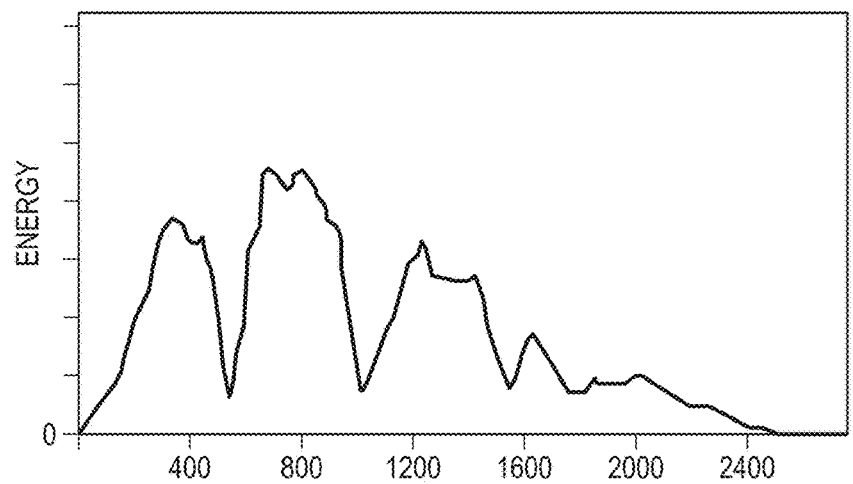

FIG. 2A illustrates a known spectral response and FIGS. 2B and 2C illustrate captured spectral responses. By way of example, FIG. 2A may illustrate the known spectral response of a soldier's helmet. The spectral response for an object (e.g., a soldier's helmet) may become "known" by previously capturing and analyzing hyperspectral images of the object and storing the spectral response in a database for future reference. FIGS. 2B and 2C are graphs that illustrate spectral responses of objects captured by hyperspectral camera 102. The spectral responses of FIGS. 2B and 2C can be compared to the known spectral response of FIG. 2A to check for a match. In the example provided in FIGS. 2A-2C, it can be seen that the spectral response of FIG. 2B is a close match to the spectral response of FIG. 2A. In contrast to FIG. 2B, it can be seen that the spectral response of FIG. 2C differs from the spectral response of FIG. 2A. Thus, it can be determined that it is likely that the object represented by FIG. 2B is the same object of FIG. 2A (e.g., a soldier's helmet). Similarly, it can be determined that it is likely that the object represented by FIG. 2C is not the same object of FIG. 2A. For instance, the object of FIG. 2C may also be a soldier's helmet, but the difference in spectral response reveals that it is not the same type of helmet as the helmet of FIG. 2B. This difference may indicate, for example, that the helmet of FIG. 2C belongs to an unfriendly soldier.

Figure 3:
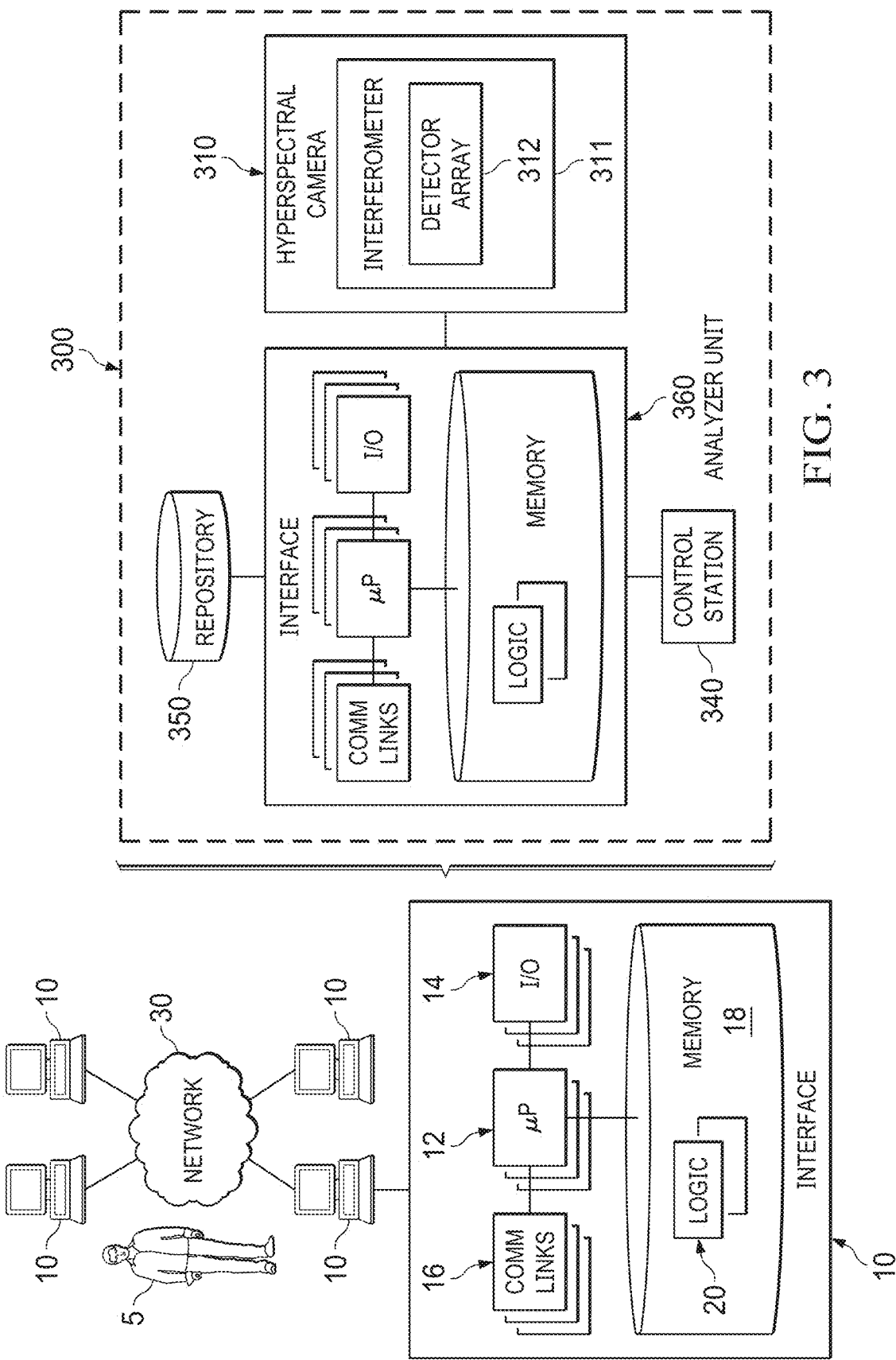
FIG. 3 is a schematic illustrating a hyperspectral imaging system for identification of a target according to aspects of the disclosure.

FIG. 3 is a schematic representation of a hyperspectral imaging system 300 according to aspects of the disclosure. In some aspects, hyperspectral imaging system 300 is similar to hyperspectral imaging system 100. Hyperspectral imaging system 300 includes a hyperspectral camera 310, a control station 340, a repository 350, and an analyzer unit 360. Hyperspectral imaging system 300 may be implemented in whole or in part by one or more computers 10 that may be accessed by a user 5. In some aspects, hyperspectral camera 310 is mounted to a vehicle, such as, for example, an aircraft or a ground vehicle. Aircraft can include a helicopter, an airplane, a tiltrotor aircraft, and the like. Ground vehicles can include cars, trucks, all-terrain vehicles, motorcycles, and aquatic vehicles such as boats. In some aspects, hyperspectral camera 310 is attached to an articulating mount that allows hyperspectral camera 310 to be aimed in desired direction. By way of example, hyperspectral camera 310 can be a Micro-Hyperspec camera made by Headwall Photonics Inc.

In some aspects, control station 340 may be connected to hyperspectral imaging system 300 via a wired or wireless communications network for receiving and transmitting data. Control station 340 may be remotely located from other components in hyperspectral imaging system 300, such as in a separate building, trailer, or similar structure. Control station 340 includes displays and controls that allow a user to direct operation of at least some aspects of hyperspectral imaging system 300. In some aspects, the control station 340 may be a portable computing device, such as a laptop computer, tablet, mobile device, or any other suitable computing device. In some aspects, the portable computing device may be onboard aircraft 104 or land vehicle 120.

Repository 350 includes memory for storage of data, such as captured hyperspectral images. In some aspects, repository 350 also stores reference data against which captured hyperspectral images may be compared to help identify objects within the captured hyperspectral images.

Analyzer unit 360 may include one or more processors, input/output devices, communications links, and memory. In some aspects, analyzer unit 360 includes an interferometer 311 with a detector array 312. Interferometer 311 modulates light collected by hyperspectral camera 310 and focuses the modulated light onto detector array 312 to determine spectral responses at each pixel of a hyperspectral image. Analyzer unit 360 uses information output by the detector array 312 to generate a data file for the hyperspectral image that includes information regarding a spectral response at each pixel of the hyperspectral image. In some aspects, interferometer 311 is incorporated into hyperspectral camera 310. In other aspects, analyzer unit 360 may include more, less, or other components. In some aspects, analyzer unit 360 may be implemented in whole or part by a computer or mobile device. In some aspects, analyzer unit 360 comprises components similar to computers 10 discussed below.

User 5 may include any individual, group of individuals, entity, machine, and/or mechanism that interacts with the one or more computers 10. Examples of users 5 include, but are not limited to, a service person, pilot, engineer, technician, contractor, agent, and/or employee. Each computer 10 may include one or more processors 12, input/output devices 14, communications links 16, and memory 18. In other aspects, each computer 10 may include more, less, or other components.

Each computer 10 may be operable to perform one or more operations of various aspects. Aspects may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Communication links 16 are operable to facilitate communication between computer system 10 and another element of a network, such as other computer systems 10. Communication links 16 may connect to any number and combination of wireline and/or wireless networks suitable for data transmission, including transmission of communications. Communication links 16 may, for example, communicate audio and/or video signals, messages, internet protocol packets, frame relay frames, asynchronous transfer mode cells, and/or other suitable data between network addresses. Communication links 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by hyperspectral imaging system 300. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium. Memory 18 can be used to store captured hyperspectral images and/or reference data against which captured hyperspectral images may be compared to help identify objects within the captured hyperspectral images.

In some aspects, memory 18 stores logic 20. Logic 20 facilitates operation of hyperspectral imaging system 300. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by hyperspectral imaging system 300. Example logic 20 may include any of the well-known OS2, UNIX, Mac-OS, Linux, and Windows Operating Systems or other operating systems. In some aspects, the operations of the aspects may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain aspects recognize that more or fewer networks may be used and that not all elements may communicate via a network. Teachings of certain aspects also recognize that communications over a network is one example of a mechanism for communicating between parties, and any suitable mechanism may be used.

Figure 4:
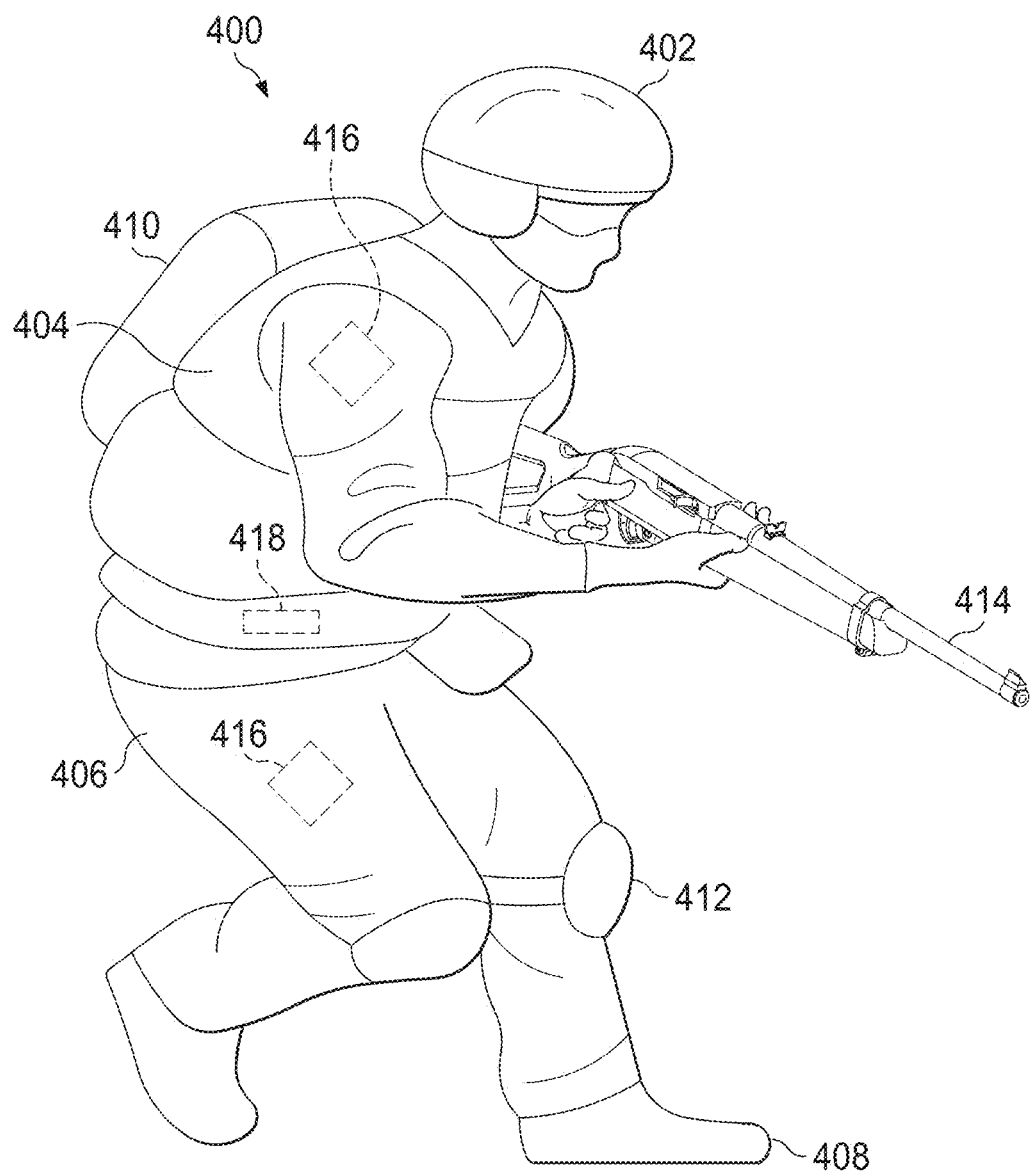
FIG. 4 illustrates a soldier for identification by a hyperspectral system according to aspects of the disclosure.

Referring now to FIG. 4, a soldier 400 for identification by a hyperspectral imaging system, such as hyperspectral imaging system 100, is illustrated. Soldiers are typically outfitted with standardized uniforms and gear. Soldier 400 illustrates a uniform and various pieces of gear that could be worn and used by a typical soldier. By way of example, soldier 400 is shown in with a helmet 402, a shirt 404, pants 406, boots 408, a backpack 410, kneepads 412, and a weapon 414. In other aspects, soldier 400 may be outfitted differently.

Each piece of gear 402-414 has a unique spectral response. To facilitate identification of soldier 400 in the field, the spectral response for each piece of gear 402-414 can be collected and stored in a database, such as memory 18 or repository 350. The stored spectral response for each piece of gear 402-414 can then be used as a known reference to compare with hyperspectral images that are subsequently captured by hyperspectral imaging system 100. In some aspects, hyperspectral imaging system 100 provides an indication that a soldier in the captured hyperspectral image is a friendly soldier if at least one object within the captured hyperspectral image matches one or more of the known spectral responses for pieces of gear 402-414. In some aspects, hyperspectral imaging system 100 only indicates a soldier in the captured hyperspectral image is a friendly soldier if more than one object within the captured hyperspectral image matches one or more of the known spectral responses for pieces of gear 402-414. Combinations of any two or more of pieces of gear 402-414 may be required for hyperspectral imaging system 100 to return a response to a user 5 that a soldier within the captured image is friendly.

The spectral response for soldier 400 can vary based upon temperature. In some aspects, this variance may be used to determine if soldier 400 is alive. For example, body heat generated by soldier 400 can alter a spectral response of one or more of gear 402-414. Hyperspectral camera 102 can detect changes in spectral response of soldier 400 based on temperature. Using temperature information, hyperspectral imaging system 100 can be used to not only identify if a soldier is believed to be a friendly soldier, but can also indicate whether or not the soldier is alive based upon changes in spectral response due to temperature changes.

In some aspects, one or more of gear 402-414 can be enhanced or modified to include a specific spectral response. For example, a hyperspectral tag 416 can be associated with soldier 400 by adding hyperspectral tag 416 to any of gear 402-414 (e.g., shirt 404 and/or pants 406). In some aspects, a material from which hyperspectral tag 416 is made is chosen to have an easily detectable spectral response. For example, hyperspectral tag 416 may comprise a radioactive component that is readily identified by hyperspectral imaging system 100. Examples of radioactive components include radioactive isotopes. In some aspects, a material for hyperspectral tag 416 is chosen to have a spectral response with an uncommon spectral response so as to be easily recognized. In some aspects, an uncommon spectral response is a signature that is difficult to replicate or fake. Examples of uncommon signatures include rare naturally occurring materials that are not native to the region employed, or, unique man-made compositions of materials. In some aspects, an uncommon signature can include incorporating a known material into one of gear 402-414. For example, aluminum thread may be incorporated into an article of clothing (e.g., sewn into shirt 404 and/or pants 406).

In some aspects, hyperspectral tag 416 can be applied to person or vehicle of interest. In some aspects, the application of hyperspectral tag 416 may be done covertly (e.g., without the person's knowledge). After the person or vehicle of interest has been tagged, hyperspectral imaging system 100 can be used to remotely follow, surveil, or and/or locate the person or vehicle of interest. This method may be used to covertly surveil enemy targets or to follow/locate and support friendly targets.

An illustrative method of using hyperspectral imaging system 100 will now be discussed relative to FIGS. 1-4. An area of interest 106 is chosen and hyperspectral camera 102 collects light emitted from area of interest 106. In general, area of interest 106 is an area where one or more objects of interest (e.g., persons of interest, vehicles of interest, or the like) is present. In some aspects, area of interest 106 is chosen based upon the presence of object of interest 110. As illustrated in FIG. 1, object of interest 110 is a group of people. The identity of the group of people may be uncertain. For example, it may be believed that the group of people includes friendly soldiers. Identification of the group of people can be confirmed by capturing and analyzing light emitted from area of interest 106. The emitted light is collected by hyperspectral camera 102 that can be mounted to aircraft 104, land vehicle 120, or satellite 130.

Once the hyperspectral image is collected, analyzer unit 360 processes the light collected by hyperspectral camera 310 to generate a hyperspectral image. Analyzer unit 360 then compares the processed hyperspectral image with known spectral responses. In some aspects, the known spectral responses are stored in one or both of memory 18 and repository 350. For example, analyzer unit 360 may compare the processed hyperspectral image with spectral responses of gear 402-414. If analyzer unit 360 determines that the processed hyperspectral image contains one or more matches with the known spectral response of one or more pieces of gear 402-414, analyzer unit 360 indicates that a match has been found. In some aspects, a match identifies the object of interest as friendly or known. If analyzer unit 360 determines that the processed hyperspectral image does not contain a match with the spectral response of one or more pieces of gear 402-414, analyzer unit 360 indicates that no match has been found. In some aspects, no match identifies the object of interest as unfriendly or unknown. In some aspects, an object of interest is tagged or marked with hyperspectral tag 416 prior to being imaged with hyperspectral imaging system 300. In these aspects, analyzer unit 360 analyzes hyperspectral images for spectral responses that match the spectral response of hyperspectral tag 416.

Indications that a match has or has not been found can be presented in various ways. In some aspects, a message is displayed at control station 340. In some aspects, a message is displayed at one or more computers 10. In some aspects, a message can be displayed at control station 340 and one or more computers 10.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment or aspect, the terms "substantially," "approximately," "generally," "around," and "about" may be substituted with "within [a percentage] of" what is specified, where the percentage includes 0.1, 1, 5, and 10 percent.

The foregoing outlines features of several aspects so that those skilled in the art may better understand the aspects of the disclosure. Those skilled in the art should appreciate that they may readily use the disclosure as a basis for designing or modifying other processes and structures for carrying out the same purposes and/or achieving the same advantages of the aspects introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A method of analyzing an object of interest with a hyperspectral imaging system, the method comprising:
   collecting, via a hyperspectral camera of the hyperspectral imaging system, light emitted by the object of interest;
   passing the collected light through an optical interferometer;
   determining, via an analyzer of the hyperspectral imaging system, a spectral response of the collected light, wherein the analyzer comprises a processor and memory;
   generating, via the analyzer, a data file of a hyperspectral image, the data file comprising information regarding a spectral response at each pixel of the hyperspectral image;
   comparing, via the analyzer, a spectral response at a first pixel of the hyperspectral image with a spectral response of a known object, the first pixel being associated with the object of interest; and
   responsive to the comparing, generating, via the analyzer, an identity of the object of interest based, at least in part, on a determination of whether the spectral response at the first pixel matches the spectral response of the known object.

2. The method of claim 1, further comprising:
   determining, via the analyzer, the identity of the object of interest to be that of the known object in response to the spectral response at the first pixel matching the spectral response of the known object; and
   determining, via the analyzer unit, the identity of the object of interest to be unknown in response to the spectral response at the first pixel not matching the spectral response of the known object.

3. The method of claim 1, further comprising comparing, via the analyzer, a spectral response at a second pixel of the hyperspectral image with the spectral response of the known object, the second pixel being associated with the object of interest.

4. The method of claim 3, further comprising:
- determining, via the analyzer, the identity of the object of interest to be that of the known object in response to the spectral response at the first pixel and the second pixel matching the spectral response of the known object; and
- determining, via the analyzer, the identity of the object of interest to be unknown in response to the spectral response at at least one of the first pixel and the second pixel not matching the spectral response of the known object.

5. The method of claim 3, further comprising:
- determining, via the analyzer, the identity of the object of interest to be that of the known object in response to the spectral response at the second pixel matching the spectral response of the known object; and
- determining, via the analyzer, the identity of the object of interest to be unknown in response to the spectral response at the second pixel not matching the spectral response of the known object.

6. The method of claim 1, wherein the data file comprises a three-dimensional dataset, the three-dimensional dataset describing an x-coordinate of the hyperspectral image, a y-coordinate of the hyperspectral image, and a wavelength of light emitted at an x-y coordinate of the hyperspectral image.

7. The method of claim 1, wherein the spectral response of the known object is a spectral response for a person generating body heat.

8. The method of claim 1, wherein the spectral response of the known object and the spectral response at the first pixel comprise wavelengths of emitted light.

9. A method of locating an object of interest with a hyperspectral imaging system, the method comprising:
- placing a hyperspectral tag on the object of interest, wherein a spectral response of the hyperspectral tag is known;
- collecting, via the hyperspectral imaging system, light emitted by an area of interest;
- processing, via an analyzer of the hyperspectral imaging system, the collected light emitted by the area of interest into a first hyperspectral image, the first hyperspectral image comprising a data file that comprises information regarding a spectral response at each pixel of the first hyperspectral image, wherein the analyzer comprises a processor and memory;
- comparing, via the analyzer, the spectral response at a first pixel of the first hyperspectral image with the spectral response of the hyperspectral tag, the first pixel being associated with the object of interest; and
- responsive to the comparing, generating, via the analyzer, an identity of the object of interest based, at least in part, on a determination of whether the spectral response at the first pixel matches the spectral response of the hyperspectral tag.

10. The method of claim 9, further comprising capturing a second hyperspectral image and repeating the processing and comparing steps for the second hyperspectral image in response to the comparing not identifying the known spectral response of the hyperspectral tag in the first hyperspectral image.

11. The method of claim 9, wherein the hyperspectral tag comprises a radioactive isotope.

12. The method of claim 9, wherein the hyperspectral tag comprises aluminum thread that is incorporated into an article of clothing worn by the object of interest.

13. The method of claim 9, wherein the object of interest is a person and the hyperspectral tag is placed on the person without the person's knowledge.

14. The method of claim 9, further comprising:
- determining, via the analyzer, the identity of the object of interest to be friendly in response to the spectral response at the first pixel being a match; and
- determining, via the analyzer, the identity of the object of interest to be unfriendly in response to the spectral response at the first pixel not being a match.

15. A hyperspectral imaging system for locating an object of interest, the hyperspectral imaging system comprising:
- a hyperspectral tag associated with the object of interest;
- a hyperspectral camera for collecting light emitted by an object of interest;
- an interferometer that modulates the collected light emitted by the object of interest;
- an analyzer for processing the modulated light to generate a data file that comprises information regarding a spectral response at each pixel of a hyperspectral image and for analyzing the hyperspectral image to locate the spectral response of the hyperspectral tag within the hyperspectral image, the analyzer comprising a CPU and memory; and
- a repository for storing captured hyperspectral images.

16. The hyperspectral imaging system of claim 15, further comprising a control station for operating the hyperspectral imaging system.

17. The hyperspectral imaging system of claim 16, wherein the hyperspectral camera, the repository, and the control station are located on an aircraft.

18. The hyperspectral imaging system of claim 16, wherein the hyperspectral camera, the repository, and the control station are located on a land vehicle.

19. The hyperspectral imaging system of claim 15, wherein the hyperspectral tag comprises a radioactive isotope.

20. The hyperspectral imaging system of claim 15, wherein the hyperspectral tag comprises aluminum thread that is incorporated into an article of clothing worn by the object of interest.

* * * * *